June 17, 1958 L. DE WITTE 2,839,721
APPARATUS FOR LOGGING THE OCEAN FLOOR
Filed Oct. 21, 1955 2 Sheets-Sheet 1

INVENTOR.
LEENDERT de WITTE
BY
*Jerry J. Dunlap*
ATTORNEY

June 17, 1958    L. DE WITTE    2,839,721
APPARATUS FOR LOGGING THE OCEAN FLOOR
Filed Oct. 21, 1955    2 Sheets-Sheet 2

INVENTOR.
LEENDERT de WITTE
BY
*Jerry J. Dunlap*
ATTORNEY

United States Patent Office 2,839,721
Patented June 17, 1958

2,839,721

APPARATUS FOR LOGGING THE OCEAN FLOOR

Leendert deWitte, Laguna Beach, Calif., assignor to Continental Oil Company, Ponca City, Okla., a corporation of Delaware Application October 21, 1955, Serial No. 541,902

2 Claims. (Cl. 324—1)

This invention relates to an improved electrical prospecting device for use in submerged areas and on the sea bottom. More particularly the invention provides means to measure the resistivities of strata underlying a body of water in order to ascertain their lithologic and structural characteristics.

Electrical prospecting methods have been widely used in the past over land and submerged areas, but they have usually been devised for obtaining information concerning the variations of the electrical characteristics of the strata with depth. There are, however, many areas under water where the sedimentary beds outcrop on the bottom of the body of water with steep dips, and where a detailed geologic survey of the outcropping formations gives very important indications relative to faulting and other structural and tectonic peculiarities of the area. For this determination, it has been customary to sample the sea bottom, usually by underwater core drilling or some other mechanical sampling device. All these mechanical methods are slow, expensive, inaccurate and furnish only discrete information.

The difficulties of mechanical sampling can be eliminated by the use of the device of this invention which furnishes detailed resistivity information concerning the outcropping strata by means of a special electrode arrangement. In the new device, the current or exploring electrode is surrounded by a broad flat guard electrode maintained at the same potential. Thus, the current is focused perpendicularly to the surface formed by the exploring and the guard electrodes into a beam which has a greater penetrating power. The depth to which the beam remains focused is approximately of the same order of magnitude as the radius of the guard electrode. The depth of investigation can be varied accordingly by varying the size of the guard electrode.

One object of this invention is to provide a novel apparatus for determining the electrical resistivity of the geological strata underlying a body of water in which variations in electrical resistivity of said strata may be observed and continuously recorded.

Another object of this invention is to provide a novel apparatus for determining the electrical resistivities of the geologic strata underlying a body of water, whereby resistance variations caused by very thin beds can be accurately determined.

A further object of the invention is to provide a novel apparatus for determining the electrical resistivities of the geologic strata underlying a body of water which can be towed under water in immediate proximity of the water bottom and continuously record said electrical resistivities.

A further object of the invention is to provide an apparatus capable of measuring the electrical resistivities of thin geological strata underlying a body of water in places where these strata are covered by several feet of ooze or sand.

Still other objects of the invention will be apparent from the following description taken in conjunction with the accompanying drawings.

Figure 1:
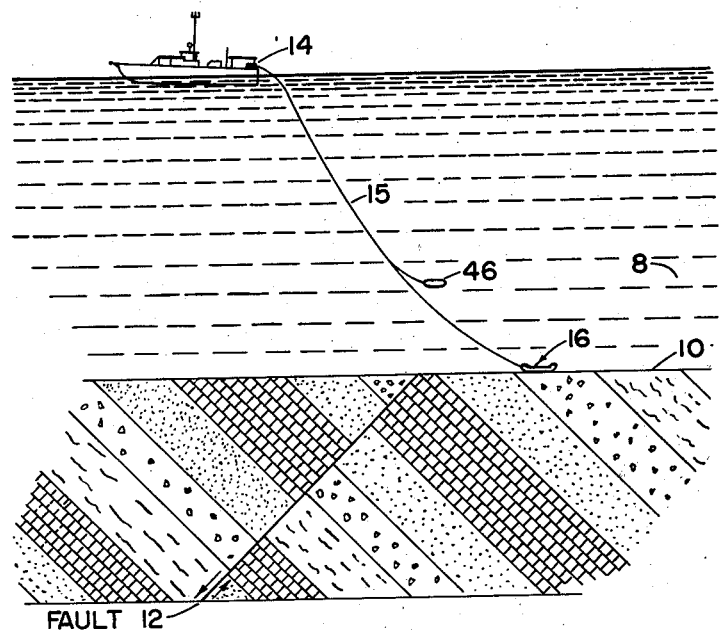
Figure 1 represents a vertical section through a body of water and underlying geological strata and shows a schematic arrangement of one embodiment of apparatus suitable for practicing the invention.

Referring now to Figure 1, a body of water 8 covers underlying geological strata outcropping on the ocean floor 10. A fault 12 has been indicated, and the corresponding displacement of the geological beds is indicated by the arrows along the fault. A boat 14 follows surveyed lines on the surface of the water and has a cable 15 secured thereto for towing an electrical tool generally indicated at 16. The tool 16 follows the surface of the ocean floor 10 by its own weight. The cable 15 insures both the mechanical and electrical connections necessary for towing and energizing the tool 16, as well as to transmit the electrical variations from the tool which have to be recorded to obtain the desired information.

Figure 3:
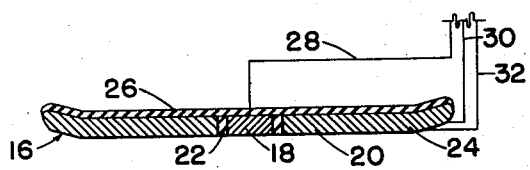
Figure 3 is a sectional view as taken along lines 3—3 of Figure 2.
Figure 2:
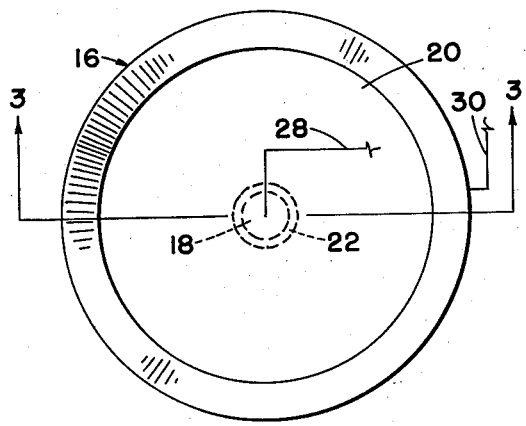
Figure 2 is a plan view of a preferred form of surveying tool.

The tool 16 (see Figs. 2 and 3) comprises a center or exploring electrode 18 concentrically surrounded in the horizontal plane by a guard electrode 20. Suitable electrical insulation 22 is disposed between the electrodes 18 and 20 for purposes that will be hereinafter set forth. The guard electrode 20 is in the form of a substantially flat circular plate to facilitate movement of the tool 16 along the ocean floor 10, and the outer edges 24 of the guard electrode 20 are preferably turned upwardly to facilitate movement of the tool 16 over objects such as rocks (not shown) which may be lying on the ocean floor 10. Generally speaking, the guard electrode 20 may be described as a slightly dished disk. It will also be observed that the bottom face of the exploring electrode 18 and insulation 22 are substantially conterminous with the bottom face of the guard electrode 20 to provide a smooth bottom surface for the tool 16. Suitable electrical insulation 26 is secured over the top surfaces of the tool 16 to prevent an upward flow of current from the electrodes 18 and 20 as will be more fully hereinafter set forth.

Figure 4:
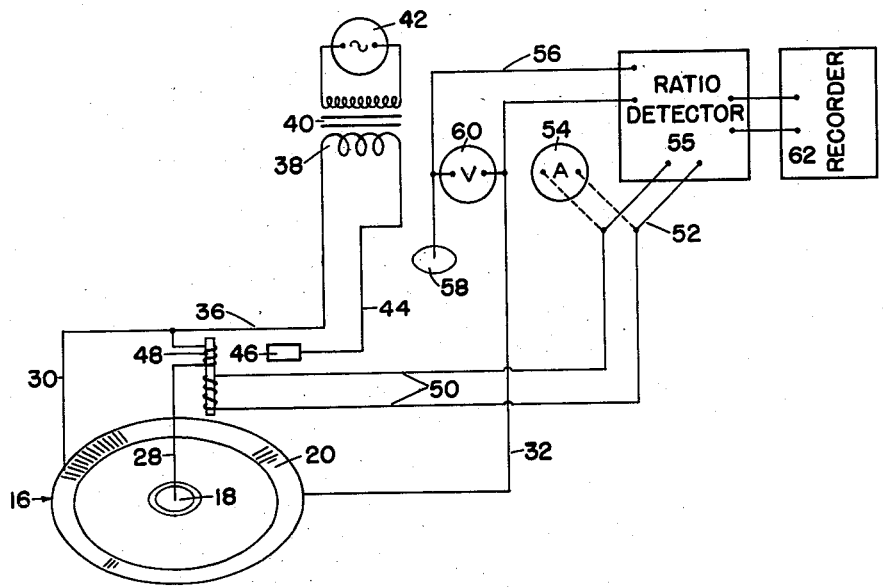
Figure 4 is a schematic diagram illustrating in greater detail the electrical circuits and recording apparatus of a preferred embodiment of the invention.

A conductor 28 extends upwardly from the exploring electrode 18, and two separate conductors 30 and 32 extend upwardly from the guard electrode 20. All of the conductors 28, 30 and 32, are suitably contained in the towing cable 15 as previously described. The type of connection of the cable 15 to the tool 16 is immaterial and is therefore not shown in detail herein. The conductors 28 and 30 (see also Fig. 4) are connected in parallel to another conductor 36 which leads to one side of the secondary 38 of a step-down transformer 40 secured in the cable 15 or located on the boat 14. The primary of the transformer 40 is suitably connected to a source of alternating current 42, and the opposite side of the secondary 38 is connected by a conductor 44 to a return electrode 46. The return electrode 46 may be suitably suspended in the water 8 from the towing cable 15, or mounted on the cable, at a substantial distance, such as 100 feet, from the surveying tool 16. The lower 100 feet of the cable 15 are electrically insulated.

A current transformer 48 (which may also be located on the boat 14 or in the towing cable 15) is interposed in the conductor 28 leading to the exploring electrode 18. The current transformer 48 has a primary of very low impedance, such as .02 ohm or smaller, in order that the transformer will not impede the flow of current to the center of exploring electrode 18. The conductors 50 of the secondary of the current transformer 48 extend to a double throw switch 52. One side of the switch 52 is connected to a suitable ammeter 54, and the opposite side of the switch is connected to the current input side of a ratio detector 55. Thus, the current transformer 48 may be connected to the ammeter 54 or, alternately, the ratio detector 55. The ratio detector 55 is of the type which provides the ratio of a voltage to a current applied thereto.

The voltage side of the ratio detector 55 is connected to the conductor 32 leading from the guard electrode 20 and another conductor 56 leading from a reference electrode 58. The reference electrode 58 is maintained at zero potential by being disposed in the body of water 8. If the boat 14 has metallic parts (not shown) in contact with the water 8, they will suffice for the reference electrode 58. Similar, but separate, metallic parts will also suffice for the return electrode 46 connected to the step-down transformer 40. A suitable voltmeter 60 is connected to the conductors 32 and 56 to provide a continuous reading of the potential existing across the guard electrode 20. The outlet side of the ratio detector 55 may be connected to any suitable recorder 62 to provide a continuous recording of the voltage/current ratio supplied by the ratio detector 55.

*Operation*

As the boat 14 proceeds along the surface of the water 8, the towing cable 15 drags the tool 16 along the water or ocean floor 10, whereby the tool 16 traverses a predetermined line on the ocean floor 10. It has already been noted that the upturned edges 24 of the guard electrode 20 provide the ncessary hydrodynamic characteristics for the tool 16 in order that the tool will ride over objects projecting upwardly from the ocean floor 10 to prevent accidental entanglement of the tool 16 and the placement of an undue stress on the towing cable 15. Also, the tool 16 may readily be constructed with flexible joints, such as hinges (not shown) to facilitate riding over obstacles. For deep penetration, very large electrodes 18 and 20 may be used, with the interior composition of the electrode being of a material such that the entire tool 16 is only slightly heavier than water.

When the current source 42 is energized, current will flow from the secondary 38 of the step-down transformer 40 through the conductor 36 and the parallel conductors 28 and 30. Since the current transformer 48 has a very low impedance, the lower surface of the exploring electrode 18 and the guard electrode 20 will be at equal potentials for all practical purposes. The guard electrode forms an equi-potential surface to which the current lines are known to be normal. Therefore, the current emitted by the exploring electrode 18 will be focused downwardly in a substantially cylindrical beam to provide an efficient penetration of the ocean floor 10. As previously noted, the current from the exploring electrode 18 will be focused for a distance approximating the radius of the guard electrode 20. In one embodiment of this invention, the guard electrode 20 may be from 5 to 10 feet in radius, thereby providing a substantial penetration of the ocean floor 10, whereby the exploring current will be propagated through any ordinary amount of ooze or sand deposited on the ocean floor 10.

The current emitted from the exploring and guard electrodes is transmitted through the ocean floor 10 and then upwardly through the water 8 to the return electrode 46. However, the current emitted from the exploring electrode 18 will be transmitted downwardly through the ocean floor 10 a sufficient distance for contacting all ordinary out-croppings at the ocean floor. It is also to be observed that since the upper surface of the tool 16 is covered by the insulation 26, all of the current emitted by the electrodes 18 and 20 will be directed downwardly into the ocean floor 10.

During the emission of current by the electrodes 18 and 20, the current transformer 48 is energized to provide a current through the conductors 50 which is proportional to the current flowing through the conductor 28. The current flowing through the conductors 50 is either measured by the ammeter 54 or directed to the respective inputs of the ratio detector 55, depending upon the position of the switch 52. Also, the conductors 32 and 56 carry a current proportional to the difference in potential between the guard electrode 20 (as well as the exploring electrode 18) and the reference electrode 58 (hence the body of water 8). This difference in potential is imposed on the remaining inputs of the ratio detector 55 and is simultaneously measured by the voltmeter 60.

It will thus be apparent that the ratio of the voltage across the conductors 32 and 56 to the current flowing through the conductors 50 will be proportional to the resistivity of that portion of the ocean floor 10 traversed by the exploring current. Therefore, variations in the resistivity of the ocean floor 10 can be immediately perceived or determined. This resistivity can be calculated from the readings of the ammeter 54 and voltmeter 60 when the switch 52 is connected to the ammeter 54, or the resistivity can be obtained directly from the ratio detector 55 when the switch 52 is connected as shown in the full lines in Figure 4.

The output of the ratio detector 55 may be continuously fed to the recorder 62 for making a continuous record or log of the resistivity of the ocean floor 10 over any predetermined line. It will be apparent to those skilled in the art that logs made by the recorder 62 for parallel lines along the ocean floor 10 may be correlated together, or they may be correlated with electrical logs obtained in on-shore or off-shore drill holes in the vicinity to determine variations in the composition of the ocean floor 10.

Figures 5, 6:
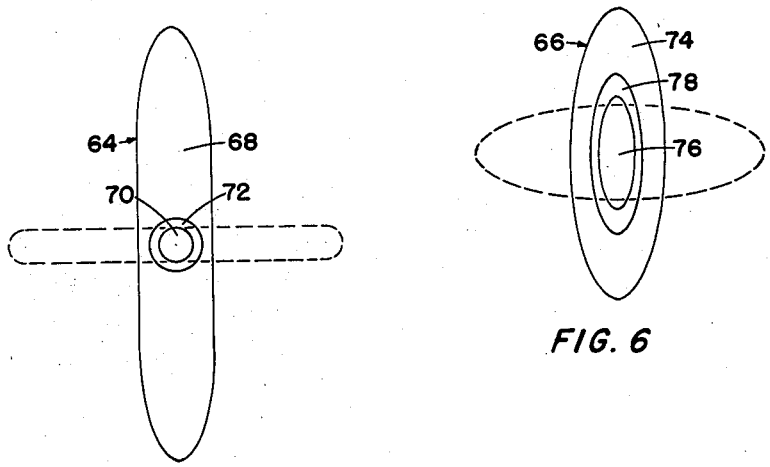
Figure 5 is a plan view of a modified form of surveying tool illustrating the disposition of the exploring current.
Figure 6 is a plan view of still another modified form of surveying tool also illustrating the disposition of the exploring current.

In the foregoing example it will be noted that the exploring current is focused in a cylindrical beam as contrasted with the usual sheet type of focusing employed in well logging apparatuses. The beam focusing effect provides a better penetration of the ocean floor, as well as increased control of the detecting current. When the guard electrode 20 has a radius of from 5 to 10 feet, as mentioned above, the exploring electrode 18 may have a diameter of 2 or 3 inches. Thus, the exploring current beam will have a diameter of approximately 2 or 3 inches which will provide indications of minute variations in the resistivity of the ocean floor 10. In other words, when using a beam type focusing effect the edge of an out-cropping or the like can be determined within an accuracy approximating the diameter of the focusing beam. However, when relatively small rocks (not shown) are lying on the ocean floor 10, the beam type focusing effect will give rise to a variation in resistivity reading or recording each time the exploring tool passes over one of these rocks. When such conditions are encountered, I provide modified exploring tools as indicated generally at 64 and 66 in Figures 5 and 6 respectively.

The tool 64 (Fig. 5) comprises an elliptically-shaped guard electrode 68 surrounding a circular-shaped exploring electrode 70 in a horizontal plane, with electrical insulation 72 between the electrodes 68 and 70. When substantially equal potential currents are applied to the electrodes 68 and 70, the current emitted by the exploring electrode 70 will extend outwardly on opposite sides of the tool 64 in a modified sheet form as indicated by the dotted lines. As a result, the tool 64 may be dragged over relatively small rocks on the ocean floor 10 and the resistance to the entire exploring current will not be substantially changed, thereby preventing indications of such rocks or the like on the resistivity log. It will be apparent that the outer edges of the guard electrode 68 may be turned upwardly to facilitate movement of the tool 64 over the small rocks or other ordinary obstructions.

The other modified exploring tool 66 (see Fig. 6) comprises an elliptically-shaped guard electrode 74 surrounding an elliptically-shaped exploring electrode 76, with suitable electrical insulation 78 interposed between the electrodes 74 and 76. The major axes of the electrodes 74 and 76 are preferably aligned. When equal potentials are applied to the electrodes 74 and 76, the exploring current will be disposed over an elliptically-shaped field, with the major axis of the field extending transversely with respect to the guard electrode 74, as indicated by the dotted lines in Figure 6. It will be observed that the exploring field of the tool 66 is a further modification of the sheet focusing effect to provide an exploring field having a greater length in the direction of movement of the tool 66, as compared to the exploring currents provided by the tool 64 or the tool 16. Thus, the tool 66 will be unaffected by larger rocks or objects than the tool 64 to facilitate the logging of an ocean bottom having relatively large rocks or other anomalies thereon which should not give an indication of change in resistivity on the final log.

From the foregoing it is apparent that the present invention provides a novel apparatus for determining the electrical resistivity of the geological strata underlying a body of water. The apparatus will provide variations in electrical resistivity of very thin strata, and the resistivities may be recorded continuously if desired. The apparatus can also be used to obtain the variations in resistivity when the ocean floor is covered by several feet of ooze or sand.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In an apparatus for determining the resistivity of geological strata underlying a body of water, including an exploring electrode, a guard electrode electrically insulated from the exploring electrode, a cable connected to said electrodes for dragging said electrodes along the bottom of the body of water, a source of electrical energy connected in parallel to said electrodes to direct current to said electrodes and maintain said electrodes at substantially equal potentials, a return electrode connected to said energy source for positioning in the body of water in spaced relation to said first-mentioned electrodes, a circuit for measuring the difference in potential between the body of water and said first-mentioned electrodes, and a circuit for measuring the flow of current through said exploring electrode, the improvement which comprises arranging the guard electrode around the exploring electrode in a horizontal plane, with said guard electrode being in the form of a slightly dished, elliptically-shaped disk.

2. Apparatus as defined in claim 1 characterized further in that said exploring electrode is elliptically shaped with its major axis extending in the same direction as the major axis of the guard electrode.

References Cited in the file of this patent

UNITED STATES PATENTS

| | | |
|---|---|---|
| 1,287,907 | Delany | Dec. 17, 1918 |
| 2,238,072 | Nelson et al. | Apr. 15, 1941 |
| 2,347,794 | Piety | May 2, 1944 |
| 2,446,303 | Owen | Aug. 3, 1948 |
| 2,531,088 | Thompson | Nov. 21, 1950 |
| 2,707,768 | Owen | May 3, 1955 |
| 2,712,629 | Doll | July 5, 1955 |
| 2,750,557 | Bricand | June 12, 1956 |